United States Patent Office 3,011,406
Patented Dec. 5, 1961

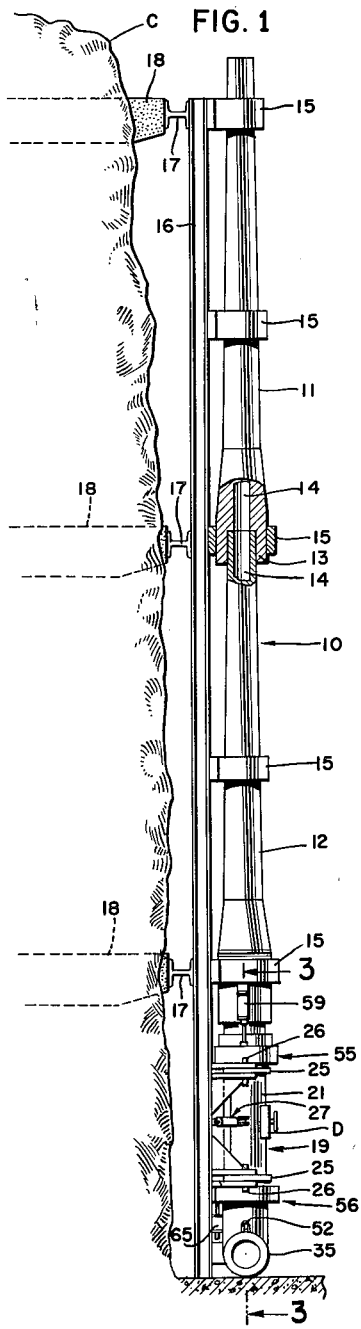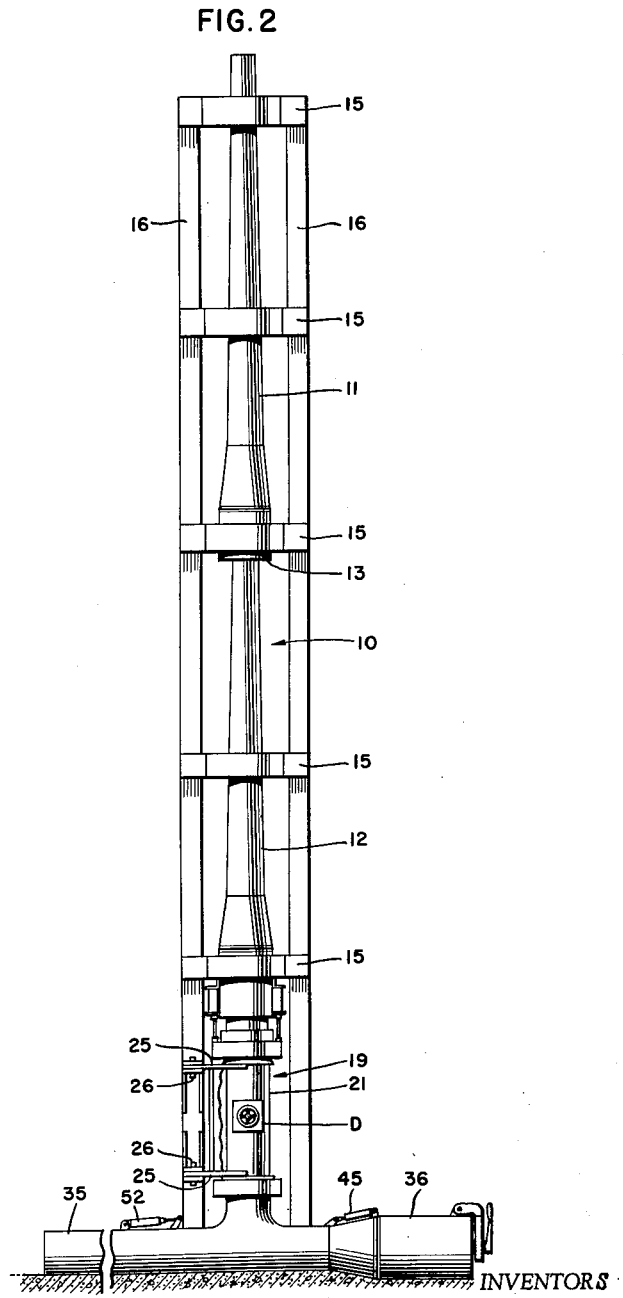

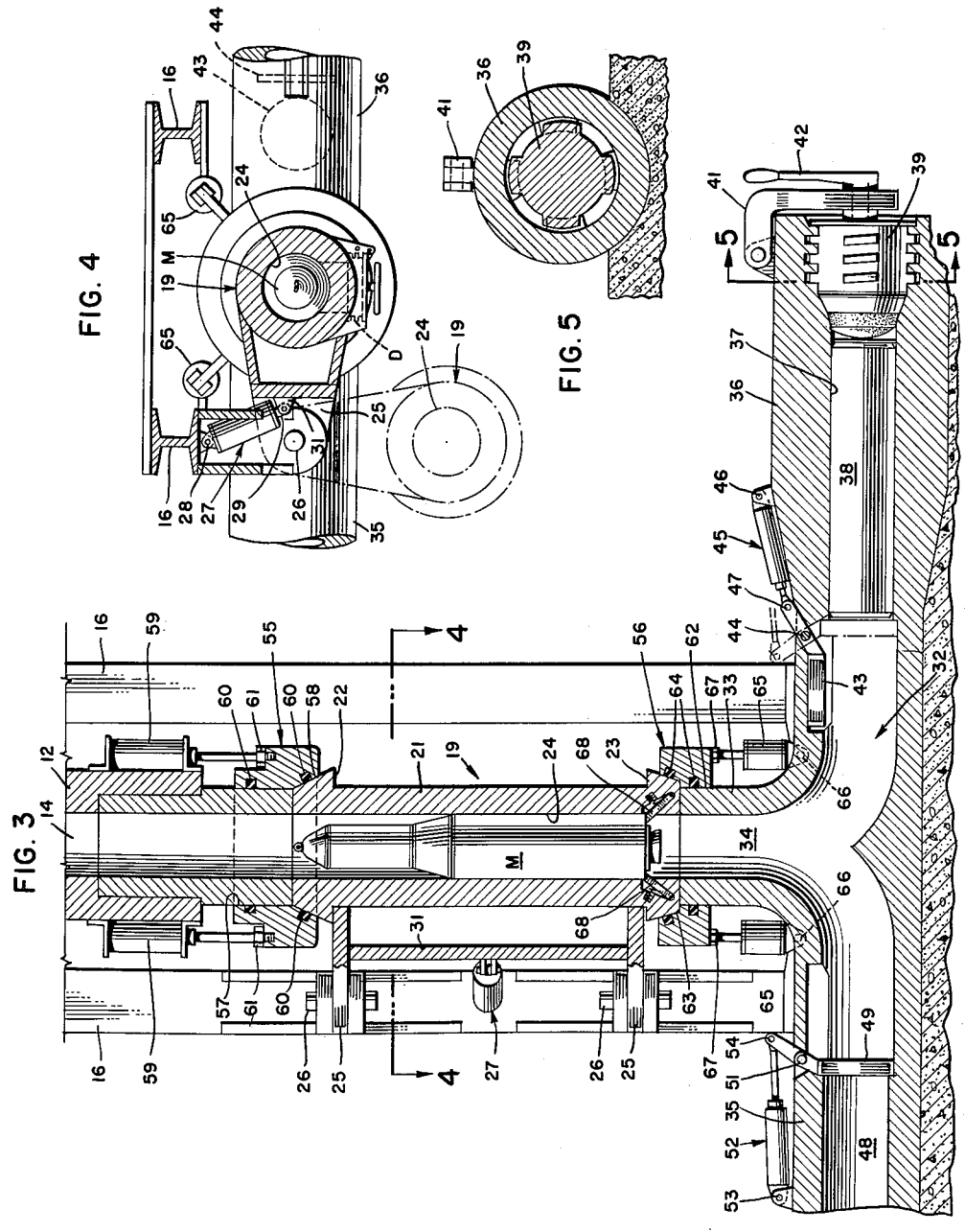

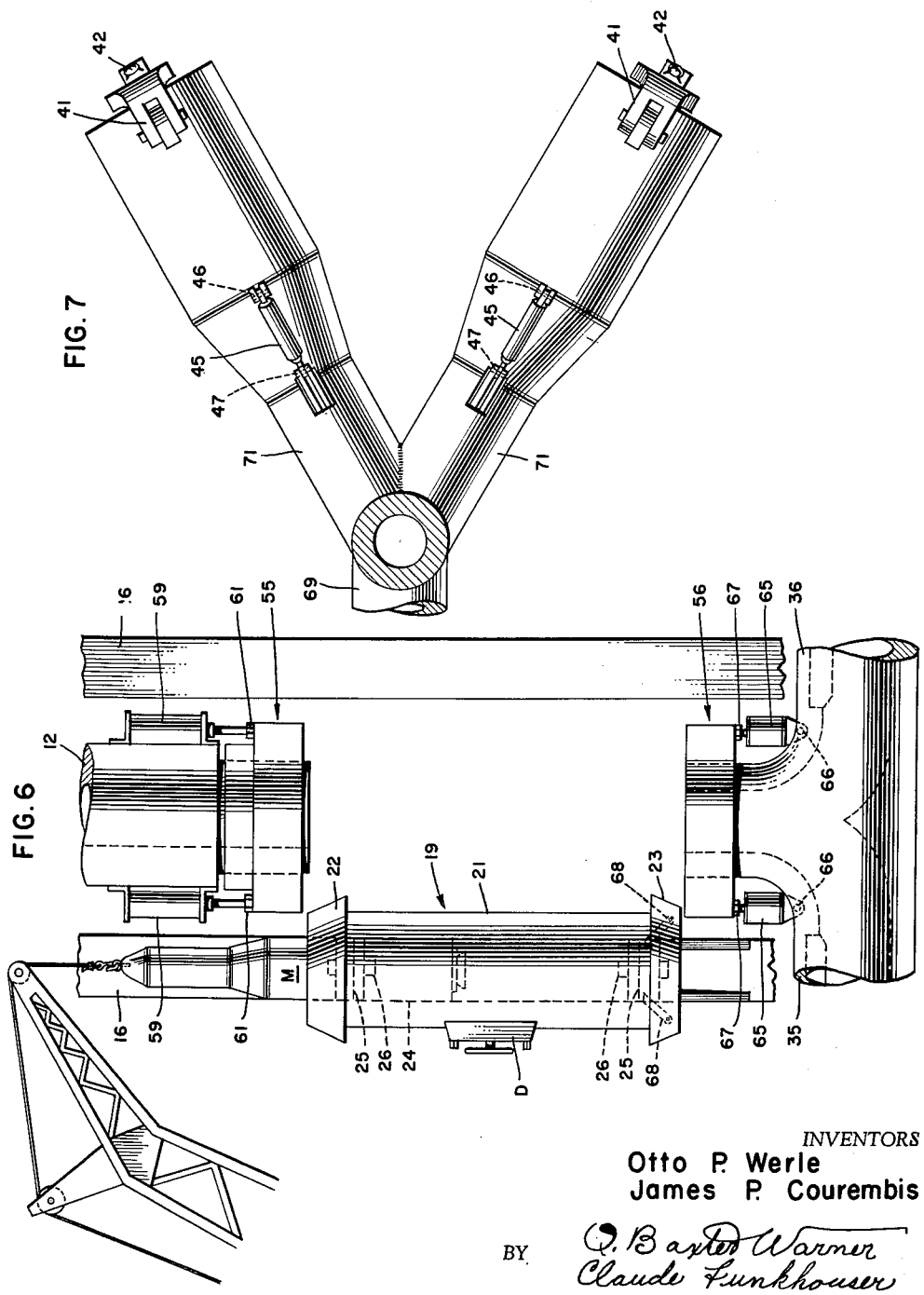

3,011,406
MISSILE LAUNCHING SYSTEM
Otto P. Werle, Oxon Hill, Md., and James P. Courembis, Washington, D.C., assignors to the United States of America as represented by the Secretary of the Navy
Filed July 28, 1959, Ser. No. 830,160
4 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to a launching device and more particularly to a missile or rocket launching and guidance device. Moreover, the invention contemplates the provision of a new and improved launching system for launching a conventional reaction motor type rocket or a satellite, as the case may be.

In prior art reaction type missiles, large quantities of fuel and numerous essential missile components require considerable space, resulting in a comparatively small space for the payload or other essential scientific equipment, as the case may be. Furthermore, due to the weight penalty involved in such rocket construction considerable fuel is consumed before rocket take-off. Also, since reaction motors heretofore employed produce relatively low energy upon initial operation and in view of the excessive weight of the rocket, during rocket launching there is a lack of stability.

The present invention provides a new and improved missile launching device which overcomes the aforesaid disadvantages encountered in prior art devices. Moreover, the invention provides missile guidance means and a stationary propellant in addition to the conventional rocket propellant or motor, the stationary propellant being initiated after initiation of the rocket propellant thereby to provide sufficient energy or thrust upon the rocket to propel the rocket from the guidance means at a relatively high and uniform rate of speed. Furthermore, by providing an additional propellant in the launching device and not within the rocket, the conventional rocket propellant may be reduced in size thereby to provide more space for the payload or essential scientific equipment, as the case may be, and also reduces the overall weight of the rocket. By the aforesaid arrangement the auxiliary propellant produces much greater acceleration for the energy expended due to pneumatic piston effect and is not part of the load to be lifted since the propellant is not carried by the rocket. Moreover, the tube of the launching device provides a rocket guide during the initial take-off of the rocket and thus the rocket will not be affected by high winds or strong cross currents. Furthermore, as the missile emerges from the guide tube by reason of the thrust exerted thereon by the confined gases produced by the rocket and stationary propellants, the speed thereof is sufficient to maintain flight stability, whereupon fins, vernier rockets or any other suitable guidance means may be employed to guide the missile along its trajectory.

An object of the present invention is to provide a new and improved launching device suitable for use with reaction motor type missiles.

Another object of the invention is to provide a launching device wherein thrust in addition to the thrust produced by the reaction motor of a rocket is applied to the rocket thereby to propel the rocket from the launching device at a relatively high and uniform rate of speed.

Still another object of the invention is to provide a launching device wherein means are provided for controlling the initial acceleration of a rocket.

A still further object of the invention is to provide a launching device wherein the confined gases produced by the rocket and stationary propellants, propell the rocket from the launching device at a rate of speed sufficiently to maintain stability of the rocket during flight.

Other objects and many of the attendant advantages of this invention will be readily appreciated as the same becomes better understood by reference to the following detailed description when considered in connection with the accompanying drawings wherein:

FIG. 1 is a side elevational view of the launching device, constructed in accordance with the present invention, and illustrating one of the ways for supporting the launching device;

FIG. 2 is a front elevational view of the device of FIG. 1;

FIG. 3 is an enlarged longitudinal sectional view taken substantially on the line 3—3 of FIG. 1;

FIG. 4 is a transverse sectional view taken substantially on the line 4—4 of FIG. 3;

FIG. 5 is a sectional view taken on the line 5—5 of FIG. 3;

FIG. 6 is a fragmentary front elevational view of the launching device, illustrating the breech in loading position and a missile being loaded therein; and FIG. 7 is a detailed sectional plan view of an alternate arrangement of the device of FIG. 1.

Referring now to the drawings and more particularly to FIGS. 1 and 2, the launching device of the present invention is generally indicated by the numeral 10 and comprises a pair of elongated barrels or tubular members 11 and 12 secured together in any suitable manner, as at 13, each tubular member having a centrally disposed bore 14 extending therethrough to provide a relatively long missile launching and guiding structure. The members 11 and 12 may be of any desired form, such, for example, as obsolete gun barrels or other tubular structure of considerable length to provide an elongated missile guidance and gas confining chamber. The launching device 10 may be supported in an operating position in any conventional manner such, for example, as by a plurality of bearings 15 disposed about the members 11 and 12 in spaced relationship with respect to each other and mounted on a pair of mutually spaced elongated supports or rails 16. A plurality of I-beams 17 are attached to the rails 16 and suitable abutments 18 or the like, arranged in a face of a cliff C. By this arrangement the launcher is rigidly supported in proximate relation with the cliff and partially concealed thereby.

As is more clearly shown on FIG. 3, a breech or missile support generally indicated by the numeral 19 is arranged at the lower end of the barrel 12. The breech comprises a tubular casing 21 having a tapered portion 22 on one end and a similar tapered portion 23 on the other end thereof and a centrally disposed bore 24 extending therethrough. The breech carries a pair of mutually spaced arms 25 pivotally connected to one of the rails 16, as at 26 whereby the breech may be moved into and out of alignment with the barrel 12. As is best shown on FIG. 4, a hydraulically operated device 27 is employed to move the breech into and out of alignment with the lowermost tubular member 12, the device 27 being pivotally mounted on one of the rails 16, as at 28 with the piston rod 29 thereof connected to a bracket 31 disposed between and carried by arms 25. Thus by this arrangement the breech may be moved from a loading position, FIG. 6, to a firing position, FIG. 3, and back to the loading position after the missile has been fired. Access door D is provided in casing 21.

It will be noted, FIG. 3, that when the breech is in the firing position it is in alignment with the barrel 12 and a blast deflector or manifold generally indicated by numeral 32. The deflector comprises tubular member 33 having a centrally disposed bore 34 or deflector chamber and a pair of conduits or passageways 35 and 36 integrally formed therewith and disposed at a right angle with respect to the member 33, the conduits being in communication with the bore 34. The conduit 36 is provided with a chamber 37 in which there is arranged an auxiliary propellant element 38, the chamber being sealed by sealing member 39 and locked in a sealing position by a locking bar 41, pivotally mounted on the terminal end of conduit 36 in locking engagement with actuating lever 42 carried by the sealing member 39, the aforesaid being similar in structure to a conventional breech lock. A gate valve 43 is arranged within chamber 37 and pivotally mounted on the conduit 36, as at 44, the valve being controlled by a hydraulically operated device 45 pivotally mounted on conduit 36, as at 46, and connected to valve 43, as at 47, whereupon the valve may be actuated to either an opened or closed position.

The conduit 35 is provided with an exhaust passageway or port 48, in communication with bore 34 in member 33 and with the chamber 37. A gate valve 49 is arranged within exhaust port 48 and pivotally mounted on the conduit 35, as at 51, the valve being controlled by a hydraulically operated device 52 pivotally mounted on conduit 35, as at 53 and connected to the valve, as at 54, whereupon the valve may be actuated to either an opened or closed position.

When the breech is in a firing position, as best shown in FIG. 3, a pair of locking and sealing devices, generally indicated by the numerals 55 and 56, are employed to lock and seal the breech in the firing position. The device 55 is slidably arranged on the lowermost end of barrel 12 and provided with a bore 57 for receiving the barrel 12, the bore terminating in a tapered recess 58 for receiving the tapered end portion 22 of the breech 19. The device 55 is provided with a pair of sealing gaskets 60 one of which is in engagement with the barrel 12, the other being in engagement with the tapered end portion 22. Movement of the member 55 into and out of engagement with portion 22 being controlled by a pair of fluid actuated devices 59 carried by the barrel 12 and connected to member 55, as at 61, whereupon the member 55 may be moved either into sealing and locking engagement with portion 22 or out of engagement therewith. It will be noted that member 56 is similar to member 55, this member, however, being slidably arranged on the tubular member 33 of the blast deflector 32 and provided with a bore 62 for receiving the member 33, the bore terminating in a tapered recess 63 for receiving the tapered end portion 23 of the breech 19. The member 56 is provided with a pair of sealing gaskets 64 one of which is in engagement with the member 33 of the deflector 32, the other being in engagement with the tapered end portion 23. Movement of the member 56 into and out of engagement with portion 23 is controlled by a pair of fluid actuated devices 65 pivotally connected to conduits 35 and 36, as at 66 and to the member 56, as at 67, whereupon the member 56 may be moved either into sealing and locking engagement with portion 23 or out of engagement therewith. From the foregoing it will be apparent that when the breech is in a firing position the devices 55 and 56 seal and lock the breech to barrel 12 and tubular member 33 with the bore 21 in the breech in alignment with bores 14 in barrels 11 and 12 and with bore 34 in member 33 of the blast deflector.

FIG. 6 illustrates one way of loading a missile into the breech, the missile being loaded into the upper end of the breech by a conventional crane device or the like. The missile may be supported in a loaded position within the breech in any suitable manner, preferably by a plurality of spring actuated supporting elements 68, pivotally mounted in member 23 and normally urged outwardly into engagement with the terminal or tail end of the missile, FIG. 3.

By the spring actuated missile supporting elements 68, the missile may be loaded into the breech from the bottom by any conventional missile ramming device. During bottom loading, it will be understood that, as the missile is rammed into the breech, the elements 68 move inwardly and out of the path of travel of the missile until the missile reaches a position as shown in FIG. 3. When this occurs, the elements 68 are urged outwardly into engagement with the terminal or tail end of the missile and thus the missile is supported in a firing position.

FIG. 7 illustrates an alternate arrangement of the deflector device 32 and comprises an exhaust conduit 69, a pair of conduits 71, similar to conduit 36, each being provided with an auxiliary propellant similar to the propellant 38. The conduits 71 are each provided with a valve similar to valve 43 and with sealing and locking means similar to the sealing and locking means 39. By this arrangement additional thrust is applied to the missile, resulting in increased and constant acceleration, greater stability, and longer flight at increased height. The launching and guidance tube, if desired, may be provided with a plurality of propellant devices, similar to the devices 36, such devices being disposed circumferentially about the tube in communication therewith and extending longitudinally along the length of the tube at spaced intervals with each circumferentially disposed group being progressively initiated thereby to progressively increase the acceleration of the missile.

For a more complete understanding of the operation of the device of the present invention attention is directed to FIG. 3, it being understood that during a warmup or a test run valve 49 is in an open position whereupon the gases from propellant fuel of the conventional rocket motor, upon initiation thereof, are exhausted by way of passageway 48 and at such time initial starting or take-off of the rocket will not occur by reason of a conventional retaining device. When the warmup and test conditions are favorable, the valve 49 is closed and concurrently therewith valve 43 is opened and stationary propellant 38 is initiated, whereupon gases produced by the rocket and stationary propellants are confined within the deflector 32. It will be understood, however, that the system does not use reaction, primarily for initial take-off of the rocket but depends also upon the action of the confined expanding gases of which a substantial amount is produced by the stationary propellant. Moreover, the propellant fuel of the rocket motor is utilized after the rocket has assumed a relatively high rate of speed at which time reaction propulsion becomes efficient. By the aforesaid gate valve or any other suitable means, initial acceleration of the missile or rocket is controlled, whereupon rocket take-off will be at a relatively high and uniform rate of speed.

From the foregoing, it will be apparent that a new and improved launching and guidance device has been devised having a breech for supporting a missile in a firing position and movable into and out of alignment with the guidance device and a blast deflector. Means are provided for controlling the initial acceleration of the rocket when the propellant fuel and the stationary propellant in the deflector have been initiated.

Obviously many modifications and variations of the present invention are possible in the light of the above teachings. It is therefore to be understood that within the scope of the appended claims the invention may be practiced otherwise than as specifically described.

What is claimed is:

1. In a launching apparatus, the combination of a rocket, pressure producing means in said rocket, an elongated tubular launching member for the rocket, a manifold in alignment with and in spaced relation with respect to said launching member and consisting of a breech chamber, an exhaust conduit and a deflector chamber, a pivotally mounted breechblock disposed between said launching member and the manifold and movable into and out of alignment therewith, said breechblock having a centrally disposed bore for receiving the rocket, hydraulically operated means for moving said breechblock into and out of alignment with said manifold and the launching member, movable means for releasably locking and sealing said launching member and the manifold to the breechblock when the breechblock is in alignment therewith, hydraulically operated devices for moving said movable means an amount sufficiently to lock and seal the launching member and the manifold to the breechblock, additional pressure producing means disposed within said breech chamber, normally open means disposed within said exhaust conduit for allowing pressure to be exhausted from said manifold in the event of premature activation of the pressure producing means in the rocket, said normally open means being movable to a closed position, normally closed means disposed within said breech chamber and movable to an open position when said normally open means is in said closed position for causing the pressure from said pressure producing means in the rocket and the pressure producing means in the breech chamber to enter said deflector chamber upon activation of said pressure producing means to launch the rocket at a relatively high and uniform initial velocity, hydraulically operated means for moving said normally open means to said closed position, and additional hydraulic means for moving said normally closed means to an open position.

2. In a launching apparatus, the combination of a missile, pressure producing means disposed within said missile, a missile launching tube, a manifold in spaced alignment with said launching tube, a breech chamber within said manifold, an exhaust conduit within said manifold and disposed opposite said breech chamber, a centrally disposed extension on said manifold and having a deflector chamber therein in communication with said breech chamber and the exhaust conduit, a missile support disposed adjacent said launching tube and manifold and movable into alignment with the launching tube and the deflector chamber when the missile is disposed within said missile support, additional pressure producing means disposed within said breech chamber, means disposed within said breech chamber for sealing the breech chamber from said exhaust conduit and the deflector chamber, and means in said exhaust conduit allowing the pressure from said additional pressure producing means to enter said deflector chamber as the additional pressure producing means is activated, said pressure from said additional pressure producing means cooperating with the pressure from the pressure producing means in the missile as the missile pressure producing means is activated.

3. In a launching apparatus, the combination of a missile, a propellant charge disposed within said missile, a fixed launching tube having a centrally disposed bore for guiding the missile as the missile is propelled therethrough, a manifold disposed in alignment with and spaced from said tube, a pivotally mounted breechblock for supporting said missile and movable into alignment with said tube and the manifold when the missile is arranged in the breechblock, means including a collar movable on said tube and manifold for sealing and locking the tube and manifold to said breechblock when the missile is in the breechblock and the tube and the manifold are in alignment therewith, said manifold having an exhaust conduit, a breech chamber and a deflector chamber in communication with said exhaust conduit and breech chamber, and a propellant charge disposed in said breech chamber, first valve means in said exhaust conduit for causing gases under pressure to enter said deflector chamber as said propellant charge in the breech chamber is activated, second valve means in said breech chamber allowing free passage of gases under pressure from said breech chamber when said first valve means is closed, said gases under pressure from said propellant charge in said breech chamber cooperating with gases under pressure from said propellant charge in the missile as the charges are activated for providing a relatively high and uniform initial velocity of said missile, means including a hydraulically operated device for moving said breechblock into alignment with the tube and the deflector chamber in the manifold, hydraulically operated means connected to said first valve means for actuating the first valve means, and additional hydraulically operated means connected to said second valve means for actuating the second valve means.

4. In a missile launching apparatus, the combination of a missile launching tube, a missile, gas pressure producing means disposed in said missile, a missile support cooperating with said tube, a manifold cooperating with said tube and support, said manifold being provided with a breech chamber, an exhaust conduit and a deflector chamber, additional gas pressure producing means disposed within said breech chamber, means in said exhaust conduit for sealing said conduit to cause the gas from said gas pressure producing means in the missile and the gas from said additional gas pressure producing means in the breech chamber to be confined and mixed within said deflector chamber as the gas pressure producing means are activated, whereupon the confined and mixed gases are of sufficient magnitude to propel the missile from the launching tube at a relatively high and uniform rate of speed, and movable means for sealing the additional gas producing means within said breech chamber, said sealing means being movable to unseal the breech chamber to allow the mixing of said gas from the gas producing means therein with the gas from said gas producing means in the missile when said exhaust conduit is sealed.

References Cited in the file of this patent
UNITED STATES PATENTS

| 2,417,983 | Holman et al. | Mar. 25, 1937 |
| 2,485,715 | Eastman | Oct. 25, 1949 |
| 2,644,364 | Nass | July 7, 1953 |
| 2,802,399 | Little | Aug. 13, 1957 |

FOREIGN PATENTS

| 125,126 | Great Britain | Apr. 17, 1919 |